United States Patent [19]

Shibahara et al.

[11] 4,152,307

[45] May 1, 1979

[54] PROCESS FOR PRODUCTION OF A WATER-IN-OIL POLYMER EMULSION HAVING AN EXCELLENT FLUIDITY USING AN ACRYLIC MONOMER CONTAINING QUARTERNARY AMMONIUM SALT

[75] Inventors: Yasuo Shibahara, Kyoto; Masashi Okada, Nagaokakyo; Kimihiko Noda; Yasuo Osuga, both of Kyoto, all of Japan

[73] Assignee: Sanyo Chemical Industries, Ltd., Kyoto, Japan

[21] Appl. No.: 863,444

[22] Filed: Dec. 22, 1977

[30] Foreign Application Priority Data

Dec. 22, 1976 [JP] Japan ................................ 51-155370

[51] Int. Cl.$^2$ ............................................. C08L 33/14
[52] U.S. Cl. .................. 260/29.6 HN; 260/29.6 WQ
[58] Field of Search ............. 260/29.6 HN, 29.6 WQ

[56] References Cited

U.S. PATENT DOCUMENTS

| | | |
|---|---|---|
| 3,284,393 | 11/1966 | Vandenhoff et al. ............... 260/29.6 |
| 3,372,149 | 5/1968 | Fertig et al. ............................. 526/15 |
| 3,957,739 | 5/1976 | Cabestany et al. ................... 526/207 |
| 4,038,233 | 7/1977 | Schultz ....................... 260/29.6 RW |
| 4,064,091 | 12/1977 | Samour et al. ............. 260/29.6 HN |

FOREIGN PATENT DOCUMENTS

| | | |
|---|---|---|
| 2446584 | 4/1975 | Fed. Rep. of Germany. |
| 1468587 | 3/1977 | United Kingdom ................... 260/29.6 |

*Primary Examiner*—M. J. Welsh
*Attorney, Agent, or Firm*—Oblon, Fisher, Spivak, McClelland & Maier

[57] ABSTRACT

A water-in-oil polymer emulsion having an excellent fluidity can be obtained by a process which comprises dispersing an aqueous solution of at least one (meth)acrylic monomer containing a quaternary ammonium salt or a tertiary amine salt in a hydrophobic organic liquid in the presence of an oil-in-water type nonionic surfactant, and heating the resulting dispersion to a temperature of at least 40° C. to polymerize the monomer mixture.

21 Claims, 1 Drawing Figure

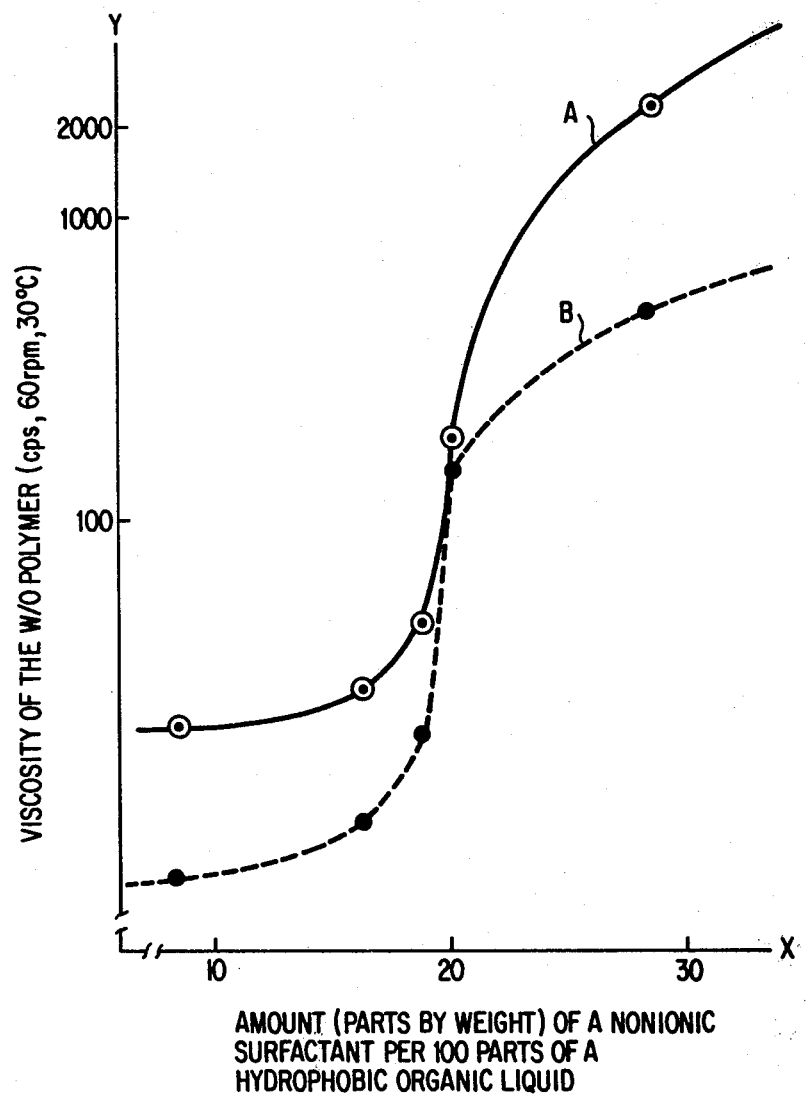

PROCESS FOR PRODUCTION OF A WATER-IN-OIL POLYMER EMULSION HAVING AN EXCELLENT FLUIDITY USING AN ACRYLIC MONOMER CONTAINING QUARTERNARY AMMONIUM SALT

BACKGROUND OF THE INVENTION

1. Field of the Invention

This invention relates to a process for producing a water-in-oil (w/o) polymer emulsion. More particularly, it relates to a process for production of a polymer emulsion useful in waste-water treatment or paper-making operations.

2. Description of the Prior Art

Generally, water-soluble or hydrophilic polymers have been industrially available in forms of powders, pastes, or w/o emulsions. Among these, w/o emulsions have recently been regarded as remarkable owing to their easy dispersibility or rapid dissolution in water as well as their ease of continuous or series dissolution.

However, in conventional w/o polymer emulsions, most of the time an accelerating agent for inversion of phase (a so-called activator) must be used to dissolve the polymer in the emulsions homogeneously into water and also these emulsions have the drawbacks of difficulties in passage through narrow pipes due to poor fluidity and of instability are the course of time.

In these respects, if a w/o polymer emulsion were produced from the ethylenically unsaturated monomer having the general formula (I) of the invention, or from a monomer mixture containing this monomer, there would remain the same problems so long as the polymerization procedures of the prior art were followed. For instance, the process of production of a w/o emulsion using a conventional w/o surfactant with a low HLB value has been disclosed in the specification of Japanese Patent Publication No. 10644,1959; however, according to that process, the produced emulsion has poor fluidity with a rather high apparent viscosity and poor stability. In order to dissolve the polymer of the emulsion in water, the addition of an accelerating agent for inversion of phase is always necessary. Furthermore, in laid open Japanese Patent Publication No. 72982/1975 is described another process for production of a w/o emulsion, wherein a surfactant having an HLB value of at least 7 is used in an mount of 20 percent by weight or more based on the oil phase. According to the process, the produced emulsion has a poor fluidity and a high apparent viscosity. Therefore, there have always been problems, including required vigorous agitation during production and difficult conduction of the product through a narrow pipe.

SUMMARY OF THE INVENTION

Under these circumstances, the inventors have made extensive researches to eliminate the drawbacks of the prior art and finally achieved the present invention.

Accordingly, it is one object of this invention to provide a process for producing a w/o polymer emulsion having a lower apparent viscosity and an excellent fluidity.

It is another object of this invention to provide a process for production of a w/o polymer emulsion having an excellent stability in properties during the course of time.

It is a further object of this invention to provide a process for production of a w/o polymer emulsion having a superior dispersibility and solubility without applying any accelerating agent for phase inversion.

It is a still further object of this invention to provide a process for production of a w/o polymer emulsion useful in waste-water treatments and effective in paper making operations.

Briefly, these and further objects of the invention, as hereinafter will become more readily apparent, have been attained broadly by providing a process for producing a w/o polymer emulsion by forming a dispersion of 30 to 70% by weight of an aqueous solution of an ethylenically unsaturated monomer and 70 to 30% by weight of a hydrophobic organic liquid in the presence of a surfactant, and polymerizing the resulting dispersion to obtain a w/o emulsion of the polymer characterized by having the viscosity of a 1% by weight aqueous solution of the polymer equal to at least 100 cps, wherein as the surfactant a nonionic surfactant of an oil in water type is used in an amount of at least 8% and less than 20% by weight of the hydrophobic organic liquid, and as the monomer component is used at least one monomer comprising a monomer having a general formula (I)

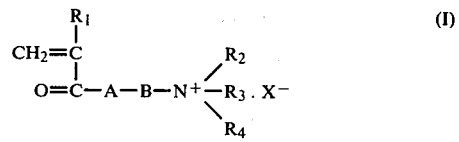

(wherein $R_1$ is H or $CH_3$; $R_2$ and $R_3$ are independently an alkyl group having 1 to 4 carbon atoms or a hydroxyalkyl group having 2 to 4 carbon atoms; $R_4$ is H, an alkyl group having 1 to 4 carbon atoms, a hydroxyalkyl group having 2 to 4 carbon atoms or a benzyl group; A is O or NH; B is an alkylene group having 1 to 4 carbon atoms or a hydroxyalkylene group having 2 to 4 carbon atoms; and $X^-$ is an anion), and the dispersion is heated at a temperature of at least 40° C. to polymerize the monomer mixture.

BRIEF DESCRIPTION OF THE DRAWING

The single FIGURE is a graph showing the relationship between the weight ratio of the nonionic surfactant to the hydrophobic organic liquid and the viscosity of the produced w/o polymer emulsion that has been obtained by embodiments of the invention as described in examples hereinafter.

DETAILED DESCRIPTION OF THE PREFERRED EMBODIMENTS

In the general formula above, $R_1$ is H or $CH_3$; $R_2$ and $R_3$ are independently an alkyl group having 1 to 4 carbon atoms or a hydroxyalkyl group having 2 to 4 carbon atoms; $R_4$ is H, an alkyl group having 1 to 4 carbon atoms, a hydroxyalkyl group having 2 to 4 carbon atoms or a benzyl group; A is O or NH, B is an alkylene group having 1 to 4 carbon atoms or a hydroxyalkylene group having 2 to 4 carbon atoms, and $X^-$ is an anion.

As the alkyl groups in $R_2$, $R_3$ and $R_4$, for instance, methyl, ethyl n-or iso-propyl and butyl groups can be listed. As the hydroxyalkyl groups in $R_2$, $R_3$ and $R_4$, for instance, $-CH_2CH_2OH$, $-CH_2CH_2CH_2OH$, $-CH_2CH(CH_3)OH$ $-CH_2CH(CH_2OH)CH_3$ can be enumerated. In B, among the alkylene groups are $-CH_2CH_2-$; $-CH_2CH_2CH_2-$, $-CH_2CH(CH_3)-$, among the hydroxyalkylene groups are $-CH_2CH(OH)$ $CH_2$— and the like. Examples of the $X^-$ are a halogen ion (such as $Cl^-$, $Br^-$), $CH_3OSO_3^-$, $C_2H_5OSO_3^-$, $HSO_4^-$, $H_2PO_4^-$, $CH_3CO_2^-$, $CH_3 C_6H_4 SO_3^-$, $CH_3SO_3^-$, $NO_3^-$ and the like. Among these anions a halogen ion, $CH_3OSO_3^-$, $C_2H_5OSO_3^-$, and $HSO_4^-$ are preferable.

The monomers of the general formula (I) [abbreviated as monomer (A)] can be classified into four groups as follows.

(1-A) (Meth)acrylates containing a quaternary nitrogen atom (acrylate and methacrylate are hereinafter referred to as (meth)acrylate)

(i) (Meth)acryloyloxyalkyltrialylammonium salts such as 2-(meth)acryloyloxyethyltrimethylammonium chloride, 2-(meth)acryloyloxyethyltrimethylammonium methosulfate, 2-(meth)acryloyloxyethyltriethylammonium ethosulfate, 3-(meth)acryloyloxypropyldimethylethylammonium methosulfate, etc.

(ii) (Meth)acryloyloxyhydroxyalkyltrialkylammonium salts such as 3-(meth)acryloyloxy-2-hydroxypropyltrimethylammonium chloride, 3-(meth)acryloyloxy-2-hydroxypropylmethyldiethylammonium chloride, 3-(meth)acryloyloxy-2-hydroxypropyltrimethylammonium methosulfate, etc.

(2-A) Salts of (meth)acrylates containing a tertiary nitrogen atom and acids (i) Salts of dialkylaminoalkyl(meth)acrylates: such as the sulfate of 2-dimethylaminoethyl(meth)acrylate, the hydrochloride of 2-diethylaminoethyl(meth)acrylate, etc.

(ii) Salts of dialkylaminohydroxyalkyl(meth)acrylates such as the hydrochloride of 3-dimethylamino-2-hydroxypropyl(meth)acrylate, the sulfate of 3-diethylamino-2-hydroxypropyl(meth)acrylate, etc.

(3-A) (Meth)acrylamides containing a quaternary nitrogen atom (i) (meth)acrylamidoalkyltrialkylammonium salts such as 3-(meth)acrylamidopropyltrimethylammonium chloride, 2-(meth)acrylamidoethyltrimethylammonium methosulfate, etc.

(ii) (Meth)acrylamidohydroxyalkyltrialkylammonium salts such as 3-(meth) acrylamido-2-hydroxypropyltrimethylammonium chloride, 3-(meth)acrylamidohydroxyethyltrimethylammonium methosulfate, etc.

(4-A) Salts of (meth)acrylamides containing a tertiary nitrogen atom and acids (i) Salts of dialkylaminoalkyl(meth)acrylamides such as the hydrochloride of 2-diethylaminopropyl(meth)acrylamide, etc.

(ii) Salts of dialkylaminohydroxyalkyl(meth)acrylamides such as the hydrochloride of 3-diethylamino-2-hydroxypropyl(meth)acrylamide, the sulfate of 3-diethylamino-2-hydroxypropyl(meth)acrylamide, etc.

Among these monomers, the monomers belonging to groups (1-A) and (2-A) are preferable, and the monomers of (1-A) and monomer mixtures comprising major proportions of the monomers of (1-A) are more preferable, since they impart an excellent fluidity and stability during the course of time to the produced emulsion. These monomers can be readily obtained by reacting a (meth)acrylate or (meth)acrylamide containing a tertiary nitrogen atom with a quaternizing agent (e.g. methyl chloride, dimethyl sulfate, diethyl sulfate, benzyl chloride, etc.) or acid (e.g. hydrochloric acid, sulfuric acid, phosphoric acid, acetic acid, para-toluene sulfonic acid, etc.).

If desired, other hydrophilic monomers can be used in conjunction with the monomer (A) in the invention. These monomers can be optionally selected from the monomers which can form an aqueous solutions of monomers along with the monomer (A). Examples of such monomers are as follows.

(1-B) Hydrophilic nonionic vinyl monomers:
(i) monomers containing a carbamoyl group such as (meth)acrylamide, etc.
(ii) monomers containing a hydroxy group such as hydroxyethyl(meth)acrylate, etc.

(2-B) Hydrophilic cationic vinyl monomers:
(i) monomers containing a tertiary nitrogen group such as vinyl pyrrolidone, vinyl pyridine, vinyl imidazoline, 2-dimethylaminoethyl(meth)acrylate, 2-dimethylaminoethyl(meth)acrylamide, etc.
(ii) monomers containing a quaternary nitrogen atom such as dimethyldiallylammonium chloride, etc.

(3-B) Hydrophilic anionic vinyl monomers:
(i) monomers containing a carboxylic group or salts thereof such as (meth)acrylic acid, sodium (meth)acrylate, etc.
(ii) monomers containing a sulfo group or salts thereof such as 2-(meth)acryloylamino-2,2-dimethyl ethane sodium sulfonate.

Among these hydrophilic monomers, the monomers of the (1-B) group are preferable, and (meth)acrylamide, hydroxyethyl(meth)acrylate, are more preferable since they produce a polymer emulsion having a high viscosity of a 1% aqueous solution of the polymer and high quality.

Furthermore, hydrophobic vinyl monomers can be used as a monomer in conjunction with the monomers mentioned above, if necessary. Among the hydrophobic monomers are aromatic vinyl monomers such as styrene, α-alkylstyrene and the like, esters of unsaturated carboxylic acids such as methyl(meth)acrylate, ethyl(meth)acrylate, and 2-ethylhexyl(meth)acrylate, vinyl esters such as vinyl acetate, and unsaturated nitriles such as (meth)acrylonitrile.

The amount of a hydrophobic vinyl monomers can vary within the scope of the invention, i.e., in a range such that the resulting polymers are soluble in water. The hydrophobic monomer is usually used in an amount of 30% or less, preferably 5% or less, based on the total amount of the monomers since it lowers the apparent viscosity of the produced emulsion. The hydrophobic vinyl monomer can be added either to the hydrophilic monomers or an aqueous solution thereof or to the hydrophobic organic liquid. In the former case, the hydrophobic monomer is used so far as the solubility of the monomer mixture in water is not adversely affected.

In this invention, the amount of the monomer (A) is at least 1% by weight, preferably 5 to 100% by weight, more preferably 20 to 100% by weight based on the total amount of monomers. When the amount of the monomer (A) is less than 1% by weight, effectiveness as either a waste-water treating agent or a paper-making auxiliary agent cannot be expected.

The concentration of the monomer(s) in the aqueous solution is generally 10 to 80% by weight, preferably 40 to 75% by weight. When the concentration is less than 10% by weight, the profitability of the emulsion production will be decreased. Whereas, when the concentration exceeds 80% by weight, the stability of the emulsion becomes worse.

Hydrophobic organic liquids used in this invention include hydrophobic aliphatic hydrocarbons and aromatic hydrocarbons, animal and vegetable oils as well as denatured oils thereof (e.g. hydrogenated oil, polymerized oil, etc.). Among these hydrophobic organic liquids, aliphatic hydrocarbons such as kerosene, paraffin, isoparaffin, etc., and liquid aromatic hydrocarbons such as benzene, toluene, xylene, etc. are preferable since the emulsions have an appropriate fluidity. IP Solvent (a product of Idemitsu Petrochemicals Co. Ltd,) and Isopar (a product of Esso Chemicals Co.), both of which are of isoparaffins with the boiling point 160° to 260° C., are more preferable.

The weight ratio of the aqueous solution containing monomer(s) to the hydrophobic organic liquid is generally in the range of 30/70 to 70/30, preferably 50/50 to 65/35. When the amount of the hydrophobic organic liquid, or the total amount of the hydrophobic organic liquid and a hydrophobic vinyl monomer when the latter is present in the hydrophobic organic liquid, is less than 30% by weight, the stability of the produced emulsion will deteriorate over the course of time. When the amount of the hydrophobic organic liquid exceeds 70% by weight, the polymer emulsion can be dispersed in water only with difficulty and the economics of production will become less profitable due to increased cost.

According to the present invention, the dispersion of an aqueous solution of monomer(s) in a hydrophobic organic liquid is formed in the presence of at least one oil-in-water type nonionic surfactant. Examples of such surfactants are as follows:

(1-C) Polyoxyethylene derivatives of higher aliphatic alcohols:
Polyoxyethylene derivatives of aliphatic alcohols having 8 to 24 carbon atoms (natural alcohols such as lauryl alcohol, cetylalcohol, stearyl alcohol, oleyl alcohol; synthetic alcohols such as oxo alcohols, Ziegler alcohols, etc.)

(2-C) Polyoxyethylene derivatives of higher fatty acids Polyethylene glycol mono- or diesters of fatty acids having 8 to 24 carbon atoms (lauric acid, palmitic acid, stearic acid, oleic acid, etc.)

(3-C) Polyoxyethylene derivatives of esters of higher fatty acids with polyhydric alcohols: Polyoxyethylene derivatives of esters of fatty acids having 8 to 24 carbon atoms (lauric acid, palmitic acid, stearic acid, oleic acid, etc.) with polyhydric alcohols or intermolecular anhydrides thereof having at least 3 hydroxy groups (glycerin, pentaerythritol, sorbitol, sorbitan, etc.)

(4-C) Polyoxyethylene derivatives of alkyl phenols: Polyoxyethylene derivatives of alkyl phenols with an alkyl group having 8 to 24 carbon atoms (octylphenol, nonylphenol, dodecylphenol dinonyl phenol, etc.)

(5-C) Esters of higher fatty acids with polyhydric alcohols: Esters of fatty acids having 8 to 14 carbon atoms (lauric acid, etc.) with polyhydric alcohols having at least 4 hydroxy groups (pentaerythritol, sorbitol, sorbitan, etc.)

These surfactants can be used singly or in combination with each other.

Among these, polyoxyethylene type nonionic surfactants [(1-C) to (4-C) groups] are preferable in order to obtain an excellent appearance and stability of the emulsion. The most preferable are surfactants of the (1-C) group. The o/w type nonionic surfactants employed in the invention have an HLB of usually at least 7, preferably 8 to 18, and more preferably 8 to 13. Nonionic surfactants having an HLB of less than 7 do not provide a w/o emulsion having an excellent appearance and stability of the emulsion. When an HLB value is too high, namely more than 18, a w/o emulsion can scarely be prepared.

Furthermore, a suitable HLB value can be predetermined from the mol % of the monomer (A) according to the following equation:

$$1.3/100\ b+7 \leq a \leq 1.3/100\ b+11,$$

where a is an appropriate HLB value, and b is the mol % of the monomer (A) based on the total monomer(s).

A w/o emulsion having self-inversibility into o/w can be easily obtained by using a surfactant having an HLB value in the above range. An HLB value can be determined according to Griffin's method or Davies' method.

The amount of the nonionic surfactant to be used is generally 8% by weight or more, but less than 20% by weight (for example 19% by weight or less), preferably between 10 and 19% by weight, more preferably between 15 and 19% by weight based on the amount of the hydrophobic organic liquid. Use of a larger amount of the surfactant than above results in a polymer emulsion having higher apparent viscosity and lower fluidity. On the contrary, if the amount of the nonionic surfactant does not reach 8% by weight, a stable polymer emulsion will not be obtained.

In this invention, formation of the dispersion of the aqueous solution of the monomer(s) and the hydrophobic organic liquid in the presence of the nonionic surfactant may be carried out by conventional methods. Examples of such methods are as follows:

(1) the surfactant and the hydrophobic organic liquid are mixed and then the aqueous solution of monomer(s) is added to the resulting mixture with stirring.

(2) the aqueous solution of monomer(s), the surfactant and the hydrophobic organic liquid are mixed simultaneously.

(3) the aqueous solution of monomer(s) and the surfactant are mixed, and then the resulting mixture is added to the hydrophobic organic liquid with stirring. In preparing the dispersion, the temperature is not restricted, but a temperature between 30° and 70° C. is practically desirable. Any ordinary stirrer such as a stirrer of propeller-type, homogenizer-type, or static mixed-type can be used for agitation in preparing the dispersion.

Polymerization of the emulsion thus prepared is carried out at a temperature usually between 40° and 90° C., preferably between 40° and 70° C. When the temperature during polymerization is below 40° C., it is impossible to get an excellent emulsion. For initiation of polymerization, the usual means such as incorporation of catalysts, or irradiation with ultra-violet or radioactive rays can be adopted. Among these means, the use of catalysts is convenient and preferable. The catalysts include azo compound catalysts such as azobisisobutyronitrile, azobisdimethyl valeronitrile; peroxides such as hydrogen peroxide, benzoyl peroxide; persulfates such as ammonium persulfate; redox catalysts [combination of oxidizing agents (such as persulfate, permanganate hydrogen peroxide, benzoyl peroxide, chlorate, bromate), and reducing agents (such as sulfite, bisulfite, oxalic acid ascorbic acid)]. Azo compound catalysts are the most preferable among these catalysts to give a polymer emulsion of an appropriate apparent viscosity. The suitable amount of the catalyst is generally 0.005 to 0.5% by weight, preferably 0.01 to 0.2% by weight based on the total amount of the monomers.

Polymerization is to be carried on until a 1% aqueous solution of the polymer shows a viscosity of at least 100 cps, preferably 200 cps or more at 30° C. The viscosity is measured by a Brookfield viscosimeter equipped with rotor No. 1, 2 or 3 rotating at 12 rpm. When the viscosity is less than 100 cps, the effectiveness in a waste-water treatment, or a paper-making process will be diminished. The w/o polymer emulsion thus prepared has a low apparent viscosity. The apparent viscosity can be determined from the viscosity of a 30% by weight emulsion of the polymer, measured at 30° C. by using a Brookfield viscometer equipped with rotor No. 1 rotating at 60 rpm. W/O polymer emulsions obtained according to this invention, have an apparent viscosity of 100 cps or less, often 50 cps or less.

The w/o polymer emulsion is mainly useful for waste-water treatment or a paper-making process. In paper-making the emulsion may be added to paper stocks at any stage between the fanpump and the head box with the aim of improving the drainage rate or increasing the retention of fillers and fines or to white water for clarification. In waste-water treatment the emulsion is added to various slurries from sewers, night-soils, industrial waste-waters. In adding to stocks, white waters or slurries the emulsion is usually diluted to a proper concentration with water. The concentration is generally 0.01 to 2.0% by weight, preferably 0.05 to 1% by weight of the polymer. The usual quantity of the polymer to be added is 0.005 to 0.2% by weight based on the amount of the slurries in waste-water, 0.005 to 0.5% by weight based on the pulp of stocks, and 0.0001 to 0.1% by weight based on white water.

Because of a low apparent viscosity or an excellent fluidity, the emulsion of this invention can be readily conveyed through a narrow pipe to a dilution tank. The emulsion is also well suited for transportation in an automatic system. The w/o polymer emulsion of this invention can be easily dispersed or rapidly dissolved in water. Without any phase inversion agent. Therefore by its use, the practical efficiency in various kinds of work in this field will undoubtedly increase. The efficiency of separating finely divided solids from an aqueous suspension in the process of waste-water treatment or paper-manufacturing is remarkably improved compared with the case when other similar chemicals are used.

Having generally described the invention, a more complete understanding can be obtained by reference to certain specific examples, which are included for purposes of illustration only and are not intended to be limiting unless otherwise specified. All percentages throughout examples are by weight unless otherwise clearly designated.

EXAMPLE 1

153 g of 3-(meth)acryloyloxypropyldimethylethylammonium methosulfate [abbreviated to (M-1)] and 147 g of acrylamide (likewise abbreviated to (CM-1)) were dissolved together in 200 g of distilled water to obtain an aqueous solution of monomers. After 70 g of polyethylene glycol (M.W.300) monooleate having an HLB value of 10.8 was dissolved in 430 g of n-hexane in a four-necked 2l flask, ⅓ of the aqueous solution was added into the flask under stirring to form a dispersion. Under an atmosphere of nitrogen, the dispersion was heated to 50° C. with continuous agitation. Then 1 ml of 10% acetone solution of azobisdimethylvaleronitrile as a catalyst was added to the dispersion. After 1 hour stirring, the remaining ⅔ of the aqueous solution containing 2 ml of 10% acetone solution of the catalyst was dropped into the flask through a dropping funnel over 2 hours. Stirring was continued for additional 1 hour and then 3 ml of the acetone solution of the catalyst was added. After stirring at 50° C. for 2 hours, the resulting mixture was allowed to cool to obtain a polymer emulsion having viscosity of 23 cps at 30° C. measured by the Brookfield viscometer (the rotor No. 1, rotating 60 rpm). The 1% by weight aqueous solution of the polymer has a viscosity of 1750 cps at 30° C. by the Brookfield viscometer (the rotor No. 2, rotating 12 rpm).

COMPARATIVE EXAMPLES 1 AND 2

Polymer emulsions were prepared according to the same procedures described in Example 1. Each recipe and viscosities of the resulting polymer emulsions and the 1% aqueous solution of the polymer are shown in Table 1 together with those in Example 1.

Table 1

| | | | Example 1 | Comparative Example 1 | Comparative Example 2 |
|---|---|---|---|---|---|
| Recipe | 3-methacryloyloxypropyldimethylethyl ammonium methosulfate | (g) | 153 | 153 | 153 |
| | acrylamide | (g) | 147 | 147 | 147 |
| | distilled water | (g) | 200 | 200 | 200 |
| | n-hexane | (g) | 430 | 430 | 430 |
| | polyethyleneglycol monooleate (HLB : 10.8) | (g) | 70 | — | — |
| | Ethyleneglycol monostearate (HLB : 3.8) | (g) | — | 70 | — |
| | Sorbitan monooleate (HLB : 4.3) | (g) | — | — | 70 |
| | Azobisdimethylvaleronitrile (10% of acetone solution) | (ml) | 6 | 6 | 6 |
| Viscosity | polymer emulsion | (cps) | 23(*1) | 185(*2) | 1220(*3) |
| | 1% aqueous solution of the polymer | (cps) | 1750(*4) | 1450(*4) | 1700(*4) |

(*1) the rotor No. 1, rotating 60 rpm
(*2) the rotor No. 2, rotating 60 rpm
(*3) the rotor No. 3, rotating 60 rpm
(*4) the rotor No. 2, rotating 12 rpm

EXAMPLE 2

The procedure in Example 1 was repeated except that 213 g of 2-methacryloyloxyethyltrimethylammonium chloride (M-2) and 87 g of methacrylamide (CM-2) were used as the monomer to obtain polymer emulsion. Each viscosity of the polymer emulsion and the 1% aqueous solution of the polymer was 26 cps (No. 1, 60 rpm) and 1,200 cps (No. 2 60 rpm) respectively. The polymer emulsion had an excellent fluidity.

EXAMPLE 3

185 g of 2-methacryloyloxyethyltrimethylammonium ethosulfate (M-3) and 115 g of acrylamide (CM-1) were mixed and dissolved in 200 g of distilled water. Different from the recipe in Example 1, 430 g of toluene instead of 430 g of n-hexane, 70 g of polyoxyethylene stearylether (containing 4 mols of oxyethylene units) (HLB: 8.1) instead of 70 g of polyethyleneglycol monooleate, 10% benzene solution of azobisdimethylvaleronitrile were used in this example. Polymerization was performed at 60° C. All of the other recipes and conditions were the same as described in Example 1. Each visosity of the polymer emulsion and the 1% aqueous solution of the polymer was 28 cps (No. 1, 60 rpm) and 1450 cps (No. 2, 12 rpm) respectively. The polymer emulsion thus obtain has had an excellent fluidity.

EXAMPLE 4 AND 5, AND COMPARATIVE EXAMPLE 3 AND 4

Polymer emulsions were prepared according to the same procedures as described in Example 3. Each recipe and viscosities of the resulting polymer emulsion, and the 1% aqueous solution of the polymer, are shown in Table 2 together with those in Example 3.

the polymer emulsion was superior and did not show any problem.

EXAMPLE 7

300 g of 2-methacryloyloxyethyltrimethylammonium methosulfate was dissolved in 200 g of distilled water to form an aqueous solution of the monomer. Separately 70 g of polyoxyethylene (containing 5 mols of oxyethylene units) sorbitan monostearate having HLB of 10.9 was dissolved in 430 g of IP Solvent placed in a four necked 2l flask. The aqueous solution of the monomer was poured into the flask with stirring to form a dispersion. While the dispersion was being kept at 50° C. on a water-bath with a flow of nitrogen for 30 minutes, 3 ml of 10% acetone solution of azobisdimethylvaleronitrile was added slowly and the dispersion was allowed to stand for 2 hours at 50° C. under stirring. Then, the mixture was allowed to cool to obtain the polymer emulsion. The viscosity of the polymer (emulsion and the 1% aqueous solution of the polymer emulsion and the 1% aqueous solution of the polymer were 12 cps (No. 1,60 rpm) and 1140 cps (No. 2,12 rpm) respectivery. The polymer emulsion had a excellent fliudity.

EXAMPLES 8 AND 9, AND COMPARATIVE EXAMPLES 5 AND 6

Table 2

| | | | Example 3 | Example 4 | Example 5 | Comparative Example 3 | Comparative Example 4 |
|---|---|---|---|---|---|---|---|
| Recipe | 2-(meth)acryloyloxyethyltriethyl ammonium ethosulfate | (g) | 185 | 185 | 185 | 185 | 185 |
| | acrylamide | (g) | 115 | 115 | 115 | 115 | 115 |
| | distilled water | (g) | 200 | 196 | 221 | 191 | 179 |
| | toluene | (g) | 430 | 425 | 442 | 424 | 386 |
| | polyoxyethylene stearylether (EM-1) | (g) | 70 | 79 | 37 | 85 | 135 |
| | the ratio of (EM-1) to toluene* (% by weight) | | 16.3 | 18.6 | 8.4 | 20.0 | 35.0 |
| | azobisisobutylonitrile (10% benzene solution) | (ml) | 6 | 6 | 6 | 6 | 6 |
| Viscosity | polymer emulsion* | (cps) | 28[*5] | 46[*5] | 22[*5] | 175[*6] | 2045[*7] |
| | 1% aqueous solution of the polymer | (cps) | 1450[*8] | 2045[*8] | 1050[*8] | 1260[*8] | 2900[*9] |

*These data are plotted on the graph as the curve A.
[*5] the rotor No. 1, rotating 60 rpm
[*6] the rotor No. 2, rotating 60 rpm
[*7] the rotor No. 4, rotating 60 rpm
[*8] the rotor No. 2, rotating 12 rpm
[*9] the rotor No. 3, rotating 12 rpm

EXAMPLE 6

Example 3 was repeated except that 288 g of 2-methacryloyloxyethyltrimethylammonium chloride (M-2) and 12 g of acrylonitrile (CM-3) were used as the monomers, 430 g of IP Solvent (a product of Idemitsu Petrochemicals Co. Ltd., a fraction of distillate between 174° and 189° C.) was used instead of toluene. All the other component chemicals and polymerization conditions were kept unchanged in Example 3. Each viscosity of the produced polymer emulsion and the 1% aqueous solution of the polymer was 32 cps (No. 1, 60 rpm) and 1,025 cps (No. 2, 60 rpm) respectively. The fluidity of Polymer emulsions were prepared according to the same procedures as described in Example 7. Each recipe and viscosities of the resulting polymer emulsion, and the 1% aqueous solution of the polymer are shown in Table 3 together with those in Example 7.

The relationship between the amount (parts by weight) of a nonionic surfactant per 100 parts of a hydrophobic organic liquid and the viscosity of the produced polymer emulsion are plotted on the accompanying graph. The results of Examples 3,4 and 5 and Comparative Examples 3 and 4 shown in Table 2 are shown as the curve A, whereas those of Examples 7,8 and 9 and Comparative Example 5 and 6 shown in Table 3 are given as the curve B.

Table 3

| | | | Example 7 | Example 8 | Example 9 | Comparative Example 5 | Comparative Example 6 |
|---|---|---|---|---|---|---|---|
| Recipe | 2-methacryloyloxyethyltrimethyl ammonium methosulfate | (g) | 300 | 300 | 300 | 300 | 300 |
| | distilled water | (g) | 200 | 221 | 196 | 191 | 188 |
| | IP Solvent | (g) | 430 | 442 | 425 | 424 | 400 |
| | Polyoxyethylene sorbitan monostearate (EM-2) | (g) | 70 | 37 | 79 | 85 | 112 |
| | the ratio of (EM-2) to IP Solvent* | (% by weight) | 16.3 | 8.4 | 18.6 | 20.0 | 28.0 |
| | Azobisdimethylvaleronitrile | | | | | | |

Table 3-continued

|  |  |  | Example 7 | Example 8 | Example 9 | Comparative Example 5 | Comparative Example 6 |
|---|---|---|---|---|---|---|---|
|  | (10% acetone solution) | (ml) | 6 | 6 | 6 | 6 | 6 |
| Viscosity | polymer emulsion* | (cps) | 12[(*10)] | 6[(*10)] | 20[(*10)] | 140[(*11)] | 475[(*11)] |
|  | 1 % aqueous solution of the polymer | (cps) | 1140[(*12)] | 880[(*12)] | 1225[(*12)] | 1125[(*12)] | 1840[(*12)] |

*These data are plotted on the graph as the curve B.
[(*10)] the rotor No. 1, rotating 60 rpm
[(*11)] the rotor No. 2, rotating 60 rpm
[(*12)] the rotor No. 2, rotating 12 rpm

What is claimed as new and desired to be secured by Letters Patent of the United States is:

1. A process for producing a water-in-oil polymer emulsion comprising forming a dispersion of 30 to 70% by weight of (a) an aqueous solution of at least one ethylenically unsaturated monomer and (b) 70 to 30% by weight of a hydrophobic organic liquid in the presence of a nonionic oil-in-water surfactant, present in an amount of at least 8% and less than 20% by weight of the hydrophobic organic liquid, said monomer comprising:

(1) 1 to 100% by weight of a monomer having the formula (I)

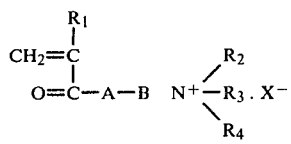

wherein $R_1$ is H or $CH_3$; $R_2$ and $R_3$ are independently an alkyl group having 1 to 4 carbon atoms or a hydroxyalkyl group having 2 to 4 carbon atoms; $R_4$ is H, an alkyl group having 1 to 4 carbon atoms, a hydroxyalkyl group having 2 to 4 carbon atoms or a benzyl group; A is O or NH; B is an alkylene group having 1 to 4 carbon atoms or a hydroxyalkylene group having 2 to 4 carbon atoms; and $X^-$ is an anion, (2) 0 to 99% by weight of another hydrophilic comonomer and (3) 0 to 30% by weight of a hydrophobic comonomer, and heating the resulting dispersion at a temperature of at least 40° C. whereby said monomer is polymerized to obtain a water-in-oil polymer emulsion, a 1% aqueous solution of which has a viscosity of at least 100 cps, wherein a 30% by weight resulting polymer emulsion has an apparent viscosity of at most 100 cps at 30° C. measured by Brookfield viscometer using No. 1 rotor at 60 r.p.m.

2. The process of claim 1, wherein said nonionic surfactant is a nonionic surfactant having an HLB value of at least 7.

3. The process of claim 1, wherein said nonionic surfactant is a polyoxyethylene nonionic surfactant.

4. The process of claim 3, wherein said polyoxyethylene nonionic surfactant is a polyoxyethylene derivative of a higher aliphatic alcohol; a higher fatty acid, or an ester of a higher fatty acid with a polyhydric alcohol or an alkyl phenol.

5. The process of claim 1, wherein said nonionic surfactant is a polyoxyethylene derivative of a $C_8$–$C_{24}$ aliphatic alcohol or a polyethylene glycol ester of a $C_8$–$C_{24}$ fatty acid.

6. The process of claim 1, wherein said nonionic surfactant is a polyoxyethylene derivative of a $C_8$–$C_{24}$ aliphatic alcohol.

7. The process of claim 1, wherein said nonionic surfactant has an HLB value satisfying the following equation:

$$1.3/100b + 7 \leq a \leq 1.3/100b + 11$$

wherein a is the HLB of the nonionic surfactant and b is the mol % of the monomer having formula (I) based on the total monomer.

8. The process of claim 1, wherein said monomer has the formula (II):

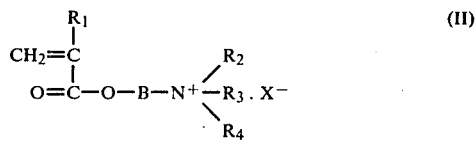

wherein $R_1$ is H or $CH_3$; $R_2$ and $R_3$ are independently an alkyl group having 1 to 4 carbon atoms or a hydroxyalkyl group having 2 to 4 carbon atoms; $R^4$ is H, an alkyl group having 1 to 4 carbon atoms; a hydroxyalkyl group having 2 to 4 carbon atoms or a benzyl group; B is an alkylene group having 1 to 4 carbon atoms or a hydroxyalkylene group having 2 to 4 carbon atoms and $X^-$ is an anion.

9. The process of claim 1, wherein said monomer is selected from the group consisting of acryloyloxyalkyltrialkylammonium salts, methacryloyloxyalkyltrialkylammonium salts, salts of dialkylaminoalkylacrylates, and salts of dialkylaminoalkyl methacrylates.

10. The process of claim 1, wherein said monomer is an acryloyloxyalkyltrialkylammonium salt or methacryloyloxyalkyltrialkylammonium salt.

11. The process of claim 1, wherein said hydrophilic comonomer is a nonionic vinyl monomer.

12. The process of claim 11, wherein said nonionic vinyl monomer is selected from the group consisting of acrylamide, methacrylamide, hydroxyethyl acrylate, and hydroxyethyl methacrylate.

13. The process of claim 11, wherein said nonionic vinyl monomer is acrylamide.

14. The process of claim 1, wherein the amount of the monomer having the formula (I) is 5 to 100% by weight and the amount of the hydrophilic comonomer is 0–95% by weight.

15. The process of claim 1, wherein the amount of the monomer having the formula (I) is 20 to 100% by weight and the amount of the hydrophilic comonomer is 0–80% by weight.

16. The process of claim 1, wherein the amount of the nonionic surfactant is 10 to 19% by weight of the hydrophobic organic liquid.

17. The process of claim 1, wherein the amount of the nonionic surfactant is 15 to 19% by weight of the hydrophobic organic liquid.

18. The process of claim 1, wherein said aqueous solution contains the monomer in concentration of 10 to 80% by weight.

19. A water-in-oil polymer emulsion obtained by heating a dispersion of 30 to 70% by weight of an aqueous solution of an ethylenically unsaturated monomer component and 70 to 30% by weight of a hydrophobic organic liquid containing a nonionic oil-in-water surfactant in an amount of at least 8% and less than 20% by weight of the hydrophobic organic liquid, to a temperature of at least 40° C. to polymerize said monomer component, wherein said monomer component comprises:

(1) 1 to 100% by weight of a monomer having the formula (I)

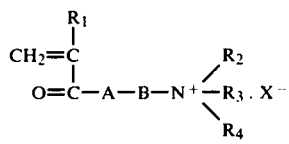

wherein $R_1$ is H or $CH_3$; $R_2$ and $R_3$ are independently an alkyl group having 1 to 4 carbon atoms or a hydroxyalkyl group having 2 to 4 carbon atoms; $R_4$ is H, an alkyl group having 1 to 4 carbon atoms, a hydroxyalkyl group having 2 to 4 carbon atoms or a benzyl group; A is O or NH; B is an alkylene group having 1 to 4 carbon atoms or a hydroxyalkylene group having 2 to 4 carbon atoms and $X^-$ is an anion, (2) 0 to 99% by weight of another hydrophilic comonomer and (3) 0 to 30% by weight of a hydrophobic comonomer.

20. The emulsion of claim 19, wherein said emulsion, when it contains 30% polymer by weight, has an apparent viscosity of at most 100 cps. at 30° C. measured by Brookfield viscometer using rotor No. 1 at 60 r.p.m.

21. A method for separating finely divided solids from an aqueous suspension thereof which comprises treating the suspension by adding thereto a sufficient amount to promote flocculation of the suspension of a water-in-oil polymer emulsion, obtained by heating a dispersion of 30 to 70% by weight of an aqueous solution of an ethylenically unsaturated monomer component and 70 to 30% by weight of a hydrophobic organic liquid containing a nonionic oil-in-water surfactant in an amount of at least 8% and less than 20% by weight of the hydrophobic organic liquid, to a temperature of at least 40° C. to polymerize said monomer component, wherein said monomer component comprises:

(1) 1 to 100% by weight of a monomer having the formula (I)

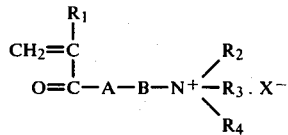

wherein $R_1$ is H or $CH_3$; $R_2$ and $R_3$ are independently an alkyl group having 1 to 4 carbon atoms or a hydroxyalkyl group having 2 to 4 carbon atoms; $R_4$ is H, an alkyl group having 1 to 4 carbon atoms, a hydroxyalkyl group having 2 to 4 carbon atoms or a benzyl group; A is O or NH; B is an alkylene group having 1 to 4 carbon atoms or a hydroxyalkylene group having 2 to 4 carbon atoms and $X^-$ is an anion;

(2) 0 to 99% by weight of another hydrophilic comonomer and (3) 0 to 30% by weight of a hydrophobic comonomer.

* * * * *